F. SHERWIN.
HARROW TOOTH.
APPLICATION FILED AUG. 15, 1916.
1,239,627.
Patented Sept. 11, 1917.
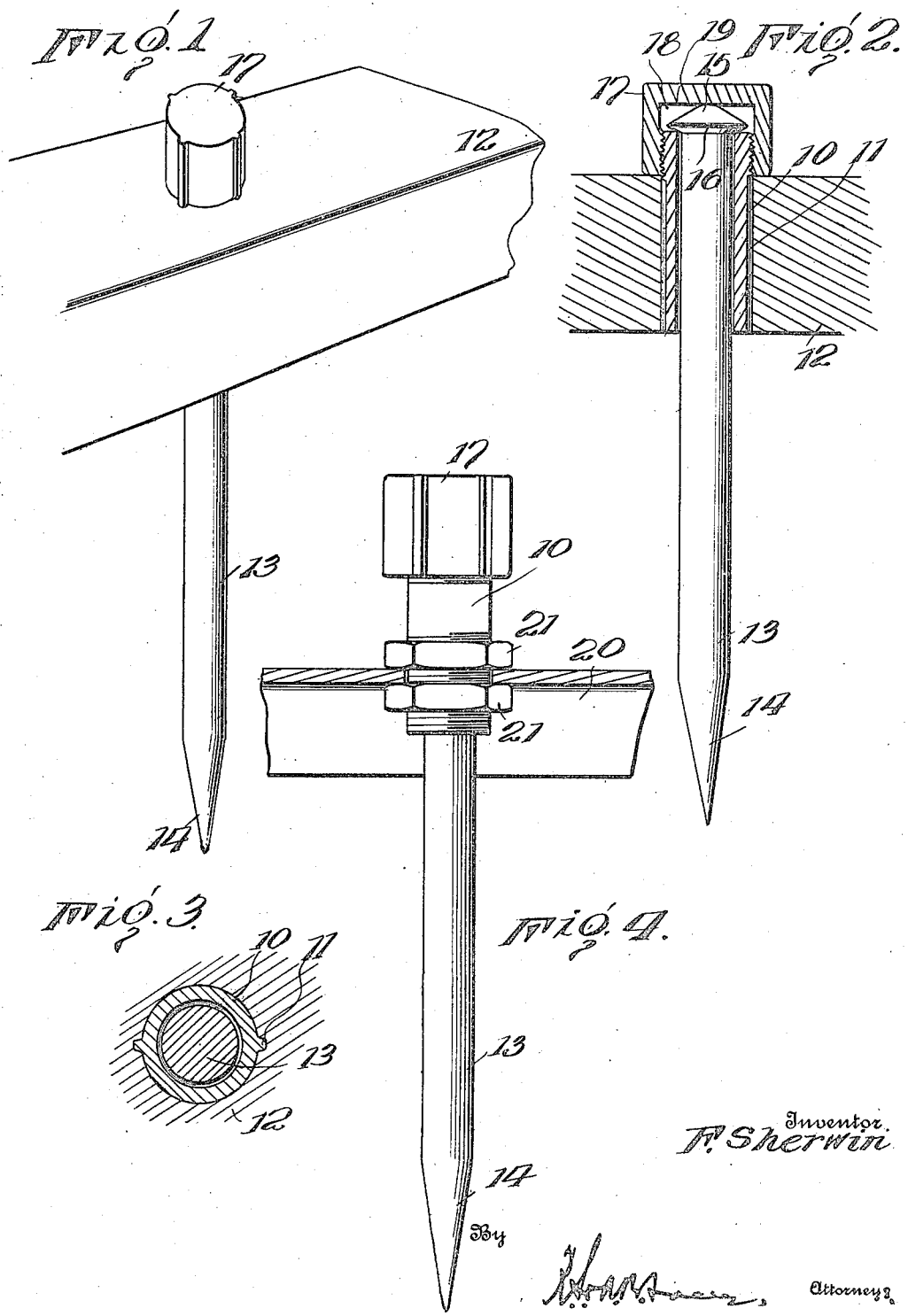

UNITED STATES PATENT OFFICE.

FRANK SHERWIN, OF BROOKINGS, SOUTH DAKOTA.

HARROW-TOOTH.

1,239,627.  Specification of Letters Patent.  Patented Sept. 11, 1917.

Application filed August 15, 1916. Serial No. 115,026.

*To all whom it may concern:*

Be it known that I, FRANK SHERWIN, a citizen of the United States, residing at Brookings, in the county of Brookings and State of South Dakota, have invented certain new and useful Improvements in Harrow-Teeth, of which the following is a specification.

This invention contemplates an improved harrow tooth and has as its primary object to provide a construction wherein the tooth will be mounted to rotate and will thus be self-cleaning.

The invention has as a further object to so form the tooth and the bearing therefor that the tooth may revolve with minimum friction.

A further object of the invention is to provide a construction wherein the harrow tooth may be easily and quickly dismounted.

And a still further object of the invention is to provide a harrow tooth mounting which may be employed in connection with harrows having either wooden or metal frames.

Other and incidental objects will appear as the description proceeds and in the drawings wherein I have illustrated the preferred embodiment of the invention and wherein similar reference characters designate corresponding parts throughout the several views:

Figure 1 is a perspective view showing my improved harrow tooth in connection with a conventional type of harrow frame member, Fig. 2 is a vertical sectional view more particularly showing the construction and mounting of the tooth, Fig. 3 is a transverse sectional view showing the engagement between the tubular bearing member or socket for the harrow tooth and the frame of the harrow, and Fig. 4 is a perspective view showing a slight modication of the invention as used in connection with a harrow having a metal frame.

In carrying out the invention, I employ a tubular bearing member or socket 10 screw threaded adjacent its upper extremity and provided, upon opposite sides thereof, with radial flanges 11. In the drawings, I have shown the invention in connection with a conventional type of harrow frame member 12. It will be observed that the socket 10 is of a length to extend through the said frame member with the flanges 11 engaging therein as particularly shown in Fig. 3 of the drawings, for holding the said socket against rotation.

Loosely mounted within the socket or bearing member 10 is a harrow tooth 13 which, at its lower extremity, may be provided with any suitable type of working terminal 14 and at its upper extremity, is formed with a conical head 15. This head is of a major diameter greater than the diameter of the body of the harrow tooth to provide a laterally extending annular shoulder 16 upon the under side of the head, and, as best shown in Fig. 2 of the drawings, the shoulder 16 is preferably beveled to engage with the upper extremity of the socket 10 for freely supporting the harrow tooth within the said socket. The socket 10 is preferably provided with a flat upper edge and in thus beveling the shoulder 16, the area of contact between the said shoulder and the upper edge of the socket will be materially reduced to thus minimize the friction therebetween.

Screw threaded upon the upper end of the socket or bearing member 10, is a retaining cap 17 which, adjacent its inner extremity, is provided with an internal chamber or recess 18 to freely receive the head 15 of the harrow tooth. The top wall of this cap is provided with a flat inner bearing face 19 confronting the head of the harrow tooth and engaged by the pointed end thereof. In use, the harrow tooth will, as will be readily understood, be urged upwardly within the socket 10 so that the head 15 of the harrow tooth will then engage with the cap 17 to rotatably support the harrow tooth. Thus the cap 17 while providing a retaining member for the harrow tooth, will also form a bearing member therefor coöperating with the socket or bearing member 10 to rotatably support the harrow tooth. In this connection, it will be observed that the area of contact between the head of the harrow tooth and the said cap will be relatively small so that but very little friction will occur therebetween. Consequently, the harrow tooth 13 may freely rotate and will thus be self-cleaning. Attention is further directed to the fact, in this connection, that should it be desired to hold the harrow tooth fixed within the socket 10, the cap 17 may be adjusted to clamp the head 15 of the harrow tooth between the cap and the said socket.

It will thus be seen that I provide a very simple and efficient construction for the purpose set forth and an arrangement which may be readily employed in connection with substantially any conventional type of harrow employing harrow teeth of the character illustrated. Should it be necessary to remove the harrow tooth for the purposes of sharpening or repair, it will be seen that this operation may be easily accomplished by simply displacing the cap 17.

In Fig. 4 of the drawings, I have illustrated a slight modification of the invention which relates more particularly to the construction of the socket for the harrow tooth whereby the said socket may be connected to a metal harrow frame member. Such a frame member is indicated at 20 and is of the ordinary angle type. The socket 10 is freely fitted through one flange of the said member and is exteriorly screw threaded to receive coacting lock nuts 21 engaging opposite sides of the said flange to securely connect the said socket member with the frame member and support the harrow tooth in position thereon. It will thus be seen that this modified construction provides an arrangement whereby my improved harrow tooth may be readily employed in connection with harrows having metal frames and since the modification, as illustrated in Fig. 4 is otherwise constructed in accordance with the preferred form of the invention, a further description thereof is deemed unnecessary.

Having thus described my invention, what I claim and desire to secure by Letters Patent is:

1. A device of the character described including a socket open at its ends, a harrow tooth freely fitted therein, and a cap coöperating with one end of the socket to provide a bearing for rotatably supporting the harrow tooth.

2. A device of the character described including a socket open at its ends, a harrow tooth freely fitted therein and having the adjacent extremity thereof formed with a pointed terminal, and a cap coöperating with one end of the socket to provide a bearing for the harrow tooth coacting with said terminal for rotatably supporting the said tooth.

3. A device of the character described including a socket, a harrow tooth fitted therein and formed with a beveled shoulder coacting with the socket for freely supporting the harrow tooth thereon, and a bearing member engaging over the upper end of the harrow tooth to provide a bearing for rotatably supporting the harrow tooth within the socket.

4. A device of the character described including a tubular socket, a harrow tooth fitted therein and provided with a head engaging the upper end of the socket for freely supporting the harrow tooth upon the socket, and a cap screw threaded to the upper end of the socket and coöperating with the head to provide a bearing for rotatably supporting the harrow tooth.

In testimony whereof I affix my signature.

FRANK SHERWIN. [L. S.]

Copies of this patent may be obtained for five cents each, by addressing the "Commissioner of Patents, Washington, D. C."